United States Patent Office 3,528,072
Patented Sept. 8, 1970

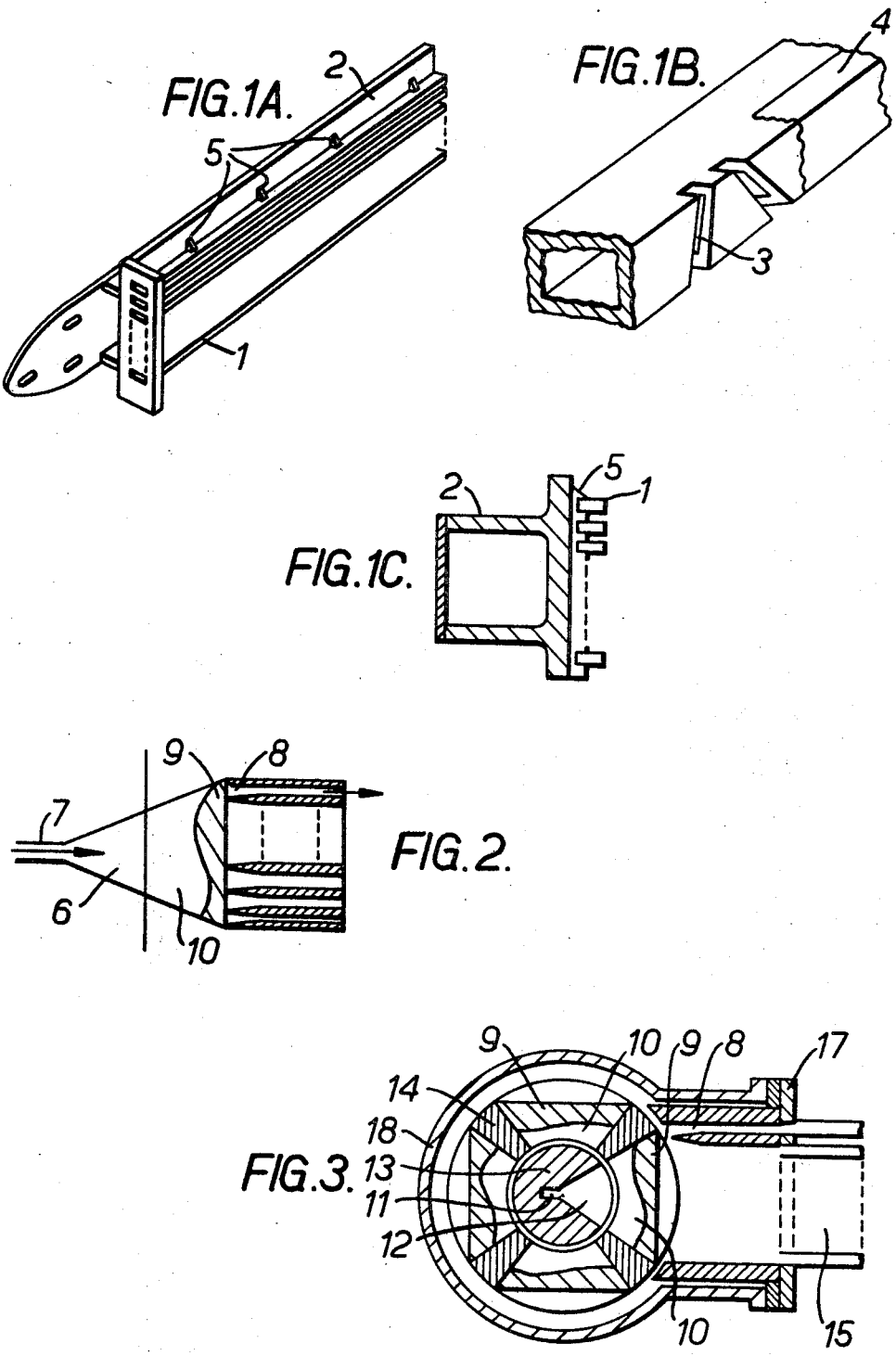

3,528,072
AERIAL SYSTEMS HAVING PLURAL LENSES, SELECTABLE FOR DELAY CORRECTION
Samuel William Pickering, Ashford, England, assignor to Electric & Musical Industries Limited, Hayes, Middlesex, England, a British company
Filed Feb. 15, 1968, Ser. No. 705,805
Claims priority, application Great Britain, Feb. 16, 1967, 7,373/67
Int. Cl. H01q *13/00, 13/10, 19/06*
U.S. Cl. 343—754                                 4 Claims

ABSTRACT OF THE DISCLOSURE

A stack of linear waveguide slot arrays are end fed in parallel by a horn shaped feeder and the vertical radiation pattern of the stack is altered by interposing within the horn feed, one of a plurality of dielectric delay correction plates having appropriate thickness variations in the stacking direction. When used in a terrain mapping radar the vertical beam pattern may be matched to different flight altitudes thereby.

---

This invention relates to improvements in or relating to aerial systems and feeders, and especially but not exclusively to an aerial system and feeder for use in a sideways looking radar system.

For terrain mapping purposes aircraft may be equipped with a form of sideways looking radar which employs aerial arrays providing a radiating pattern directed laterally to the flight axis of an aircraft. Such an array would have a narrow horizontal beam width and a vertical beam pattern of approximately a cosec squared form, whose optimum shape is dependent on the altitude at which the aircraft is expected to fly. Thus in order to enable the radar to be used effectively when the aircraft is flying at alternative heights it has been proposed that the vertical radiation pattern to be adjusted by bodily tilting the beam forming array. Such a scheme has proved to be bulky and to require a large volume of space for tilting, especially as the radiating array must be of very rigid construction in order to maintain the required narrow horizontal beam width. In addition the vertical radiation pattern can only be made strictly correct for one flight altitude.

It is an object of the present invention to provide an improved method and apparatus for altering the vertical radiation pattern of a sideway looking radar aerial array to allow for operation at different altitudes of flight above the terrain and which overcomes the above difficulties wholly or in part.

According to the invention there is provided an antenna system made up of a stack of end fed linear arrays of radiators, a portion of waveguide, coupling means for coupling said waveguide simultaneously with the ends of all said linear radiating arrays, wherein the improvement consists of the provision of a plurality of delay correction means which may be interposed selectively within said coupling means in order that the shape of the radiation pattern of said antenna system in the stacking direction may be altered to correspond to any one of a plurality of desired forms.

The coupling means may be in the form of a horn and each delay correction means may comprise a dielectric lens of varying thickness. A plurality of such dielectric lenses may be mounted on an assembly moveable with respect to the coupling means so that respective coupling lenses may be selectively interposed within the coupling means to alter the radiation pattern.

In one embodiment of the invention the correction lenses are made of dielectric of varying thickness mounted on an annular assembly surrounding the feed horn and the selection of any one lens is carried out by rotating the annular assembly with respect to the remainder of the feed system. In one application to a sideways looking flight radar the invention is employed to select the radiation pattern most appropriate to a selected one of a plurality of flight altitudes.

In order that the present invention may be clearly understood and readily carried into effect one embodiment thereof will now be described by way of example and with reference to the drawings of which:

FIGS. 1A, B and C are a perspective view, a detail view and a cross section of a stack of linear waveguide narrow-wall slot aerial arrays to which the invention is to be applied, FIG. 2 illustrates a basic form of the invention, and FIG. 3 shows a practical embodiment of the invention.

In a sideways looking flight radar which it is desired to use for terrain mapping it is important for the antenna system to generate a very narrow horizontal radiation pattern. Thus a linear array of considerable length is required and this array must be mounted with a high degree of rigidity so that any vibration in the aircraft is not allowed to distort the array and degrade the horizontal radiation pattern. It is therefore usual for the aerial array to be mounted on a substantial beam of high rigidity.

In terrain mapping radars it is usual to so dimension the vertical radiation pattern of aerial system so that the variation of system sensitivity with distance is compensated for as far as possible. Thus the antenna is caused to have higher gain for transmission and reception for reflecting objects situated further away from the radar and it is normal to make the vertical radiation pattern follow approximately a cosecant squared law. However the ideal shape of the vertical radiation pattern will vary in dependence on the height at which the aircraft is flying and the present tendency is to require height facilities ranging from "tree-top" to extremely high altitudes. This necessitates the provision for a considerable variety of vertical beam shapes.

In prior proposals a single array of radiators cooperating with a beam forming assembly such as a horn or a microwave lens or combinations thereof was arranged so that either the assembly as a whole could be tilted in a vertical plane or the tilt could be applied simply to the radiating array. In either case the space required was large and in the latter case the rigid mounting necessary for the array detracted from the apparent improvement. In addition the shape of the vertical radiation pattern could in general only be made correct for a given altitude and at other altitudes only a compromise pattern could be employed. When the amount of space is very limited a flat aerial system is a preferable choice and such a system is illustrated in FIGS. 1A, B and C. FIG. 1A shows a perspective view of a flat aerial system consisting of a stack of horizontal slotted waveguide arrays 1 attached to a rigid, though weight reduced, backing beam 2. The arrays 1 consist of narrow wall slot radiators 3 shown in the detail of FIG. 1B. The slots 3 are covered with a suitable dielectric covering 4, shown partly removed in FIG. 1B, so that the waveguide system can be pressurised. FIG. 1C is a cross section of the system showing how the waveguides 1 are firmly attached to the weight reduced beam 2 by means of sleepers arranged at frequent intervals along the array. The waveguides 1 are bonded to the sleepers by means of a suitable bonding adhesive, such as an epoxy resin.

The waveguides 1 of the stack of radiating arrays are end fed with energy by horn feeding means 6 shown in FIG. 2 coupled to a main system waveguide 7. Tapered transformation sections 8 are arranged between the feed horn 6 and the individual waveguide arrays 1 for matching purposes. The correct phase and amplitude of the energy fed to each of the arrays 1 of the stack to give the correct shape of radiation pattern in the vertical plane, for a given flight altitude of terrain mapping is provided by a suitably designed dielectric lens 9 placed in a segment 10 of the horn feed 6. In accordance with the invention the segment 10 containing the lens 9 is made moveable so that it may be replaced by another similar segment containing a different lens so computed to provide a vertical radiation pattern suitable for terrain mapping at a different altitude.

A practical embodiment of the invention is shown in FIG. 3 to which reference will now be made. The feed waveguide 11 is arranged with its axis normal to the plane of the diagram and feeds a fixed portion 12 of the feed horn 6. The fixed parts 11 and 12 of the feed 6 are located in a member 13 which forms the hub of an annular assembly 14. The annular assembly 14 contains four sections of horn 10 with corresponding dielectric lens portions 9, and is arranged so that it can be selectively rotated about the member 13 to introduce any desired one of the lenses 9 into the feed to the aerial system 15, via the matching section 8 bolted to the end flange 17 thereof. But suitably designing each of the lenses 9 for a corresponding predetermined flight altitude, operation at different altitudes may readily be provided with a minimum of weight penalty and the optimum vertical radiation pattern may be achieved for each of the predetermined flight altitudes. Pressurisation of the waveguide system is ensured by surrounding the feed selecting mechanism by an airtight cover 18.

The invention has been described with reference to a specific embodiment in an antenna comprising a parallel stack of linear waveguide slot arrays. It is not intended that the scope of the claims should be limited to such a system since the invention is equally well suited to feeding other forms of arrays in parallel.

What I claim is:

1. An antenna system made up of a stack of end fed linear arrays of radiators, a portion of waveguide, coupling means for coupling said waveguide simultaneously with the ends of all said linear radiating arrays, wherein the improvement consists of the provision of a plurality of delay correction means which may be interposed selectively within said coupling means in order that the shape of the radiation pattern of said antenna system in the stacking direction may be altered to correspond to any one of a plurality of desired forms.

2. An antenna system according to claim 1 in which said coupling means is in the form of a horn.

3. An antenna system according to claim 1 in which each of said delay correction means comprises a dielectric lens of varying thickness.

4. An antenna system according to claim 1 in which said delay correction means are mounted on an annular assembly, and including means for rotating said annular assembly with respect to said coupling means in order to interpose selectively a respective delay correction means within said coupling means.

References Cited

UNITED STATES PATENTS

| | | | |
|---|---|---|---|
| 2,599,864 | 6/1952 | Robertson et al. | 343—783 |
| 3,004,259 | 10/1961 | Shanks et al. | 343—771 X |
| 3,005,983 | 10/1961 | Chandler | 343—909 X |
| 3,286,260 | 11/1966 | Howard | 343—771 X |
| 3,311,917 | 3/1967 | Thourel | 343—771 X |
| 3,413,640 | 11/1968 | Freeman et al. | 343—771 |

HERMAN K. SAALBACH, Primary Examiner

T. J. VEZEAU, Assistant Examiner

333—31, 98; 343—768, 771, 783